3,021,301
PROCESS FOR PRODUCING A NOVEL HYDROLYZED POLYACRYLONITRILE REACTION PRODUCT CONTAINING POLYVINYL ALCOHOL AND THE PRODUCT PRODUCED THEREBY
Tzeng Jiueq Suen and Arthur Maurice Schiller, New Canaan, Conn., assignors to American Cyanamid Company, New York, N.Y., a corporation of Maine
No Drawing. Filed May 19, 1958, Ser. No. 735,986
7 Claims. (Cl. 260—45.5)

This invention relates to a method for the production of hydrolyzed polyacrylonitriles of improved properties and to the products obtained thereby.

Hydrolyzed polyacrylonitriles are used commercially as thickening agents for dye pastes and in textile-treating compositions and for a number of similar purposes wherein a light-colored product is desired. They are also sold for a number of uses wherein a product having a controlled high molecular weight is needed, as in the settling of ore pulps and the conditioning of drilling muds.

An object of the invention is to provide an improved method for producing hydrolyzed polyacrylonitrile.

Another object of the invention is to provide improved hydrolyzed polyacrylonitrile.

A further object of the invention is to provide improved hydrolyzed polyacrylonitrile of lighter color and lower content of alkali or other inorganic salts.

Acrylonitrile has previously been polymerized by the methods usually employed for polymerizing other ethylenically unsaturated aliphatic compounds; that is, by dispersing the monomer in water which usually contains an emulsifying agent, adding a per-oxygen compound as a catalyst either alone or in conjunction with a reducing agent, and maintaining the system at a suitable reaction temperature until the polymerization is completed. A wide variety of such polymerization catalysts is known to those skilled in the art. This method, however, when applied to acrylonitrile, using catalysts which have been widely used and generally successful for other purposes, such as potassium persulfate with sodium bisulfite, has generally resulted in a white polymer which, upon hydrolysis with an alkali, becomes extremely pasty and passes through a thick, red stage, causing the hydrolysis to be slow and difficult to control, and a substantial excess of alkali is necessary to obtain an adequately hydrolyzed, completely water-soluble product of relatively dark amber color. Also, when the theoretical quantity of sodium hydroxide necessary for complete hydrolysis is used, for example, the —CN groups in the product are seldom more than 70% hydrolyzed to sodium carboxylate groups; and the unreacted caustic soda remains in the product. For a higher degree of hydrolysis, an even greater excess of alkali must be used; and when the product is neutralized for certain purposes by adding an acid, a corresponding quantity of inorganic salt is formed in the product. This salt contamination is highly objectionable for many of the end uses of hydrolyzed polyacrylonitriles.

The present invention is based on the discovery of an improved combination of polymerization and hydrolysis steps involving polymerizing acrylonitrile in the presence of polyvinyl alcohol with a certain specific class of oxidation-reduction catalysts and preferably in the presence of a wetting agent to a polymer product that does not develop a thick, pasty mass upon hydrolysis, but remains fluid and is easily hydrolyzed with much smaller proportions of alkali. In fact, the polymers produced by our improved process can be hydrolyzed with from about 0.5 to 0.8 mole, and usually below 0.7 mole, of alkali per mole of acrylonitrile in the polymer to an extent comparable to that which previously required at least an equi-molecular quantity of alkali. The presence in the hydrolyzed product of substantial quantities of inorganic salt is thus obviated. We believe that this improved hydrolysis is the result of a somewhat different structure of the polymers produced by the utilization of polyvinyl alcohol in accordance with the method of our invention, but the invention is of course not dependent upon this theory.

Our preferred polymerization procedure is based on the concept of establishing a body of acidified water in a reaction vessel and simultaneously injecting separate streams of acrylonitrile, the oxidation component of the catalyst system and the reduction component of the catalyst system into this body at rates which are desirably sufficiently slow to maintain a constant reaction temperature therein, usually with the aid of a cooling system. Water-soluble polyvinyl alcohol is incorporated into this system by dissolving it in the water before the acrylonitrile and catalyst streams are injected; and amounts of about 0.1 to about 5.0%, and preferably 0.2 to about 2% of the weight of the acrylonitrile are recommended. The function of the polyvinyl alcohol which is essential for the improved hydrolyzed product is not fully understood. Its presence, however, is believed to improve the inherent properties of the polyacrylonitrile by a mechanism involving the graft copolymerization of acrylonitrile monomer on the polyvinyl alcohol units. Because of the presence of the strongly hydrophilic polyvinyl alcohol units in the polymerizing reaction mass, the hydrolysis is characterized by a more rapid and complete reaction and the reaction itself needs substantially less caustic. Moreover, a substantially clearer reaction product as distinguished from polyacrylonitrile prepared in the absence of this material is obtained. The property imparted to polyacrylonitrile by polyvinyl alcohol when the latter is employed in the polymerization medium is unique. Polyvinyl alcohol has been associated with emulsifiers and dispersing agents. However, the distinct advantages of the invention are not obtained when the polymerization is conducted in the presence of known emulsifiers or wetting agents and in the absence of polyvinyl alcohol. The behavior of polyvinyl alcohol is indispensable to the practice of the present invention and differs from that of a wetting agent. The presence of a small amount of wetting agent in addition to polyvinyl alcohol is beneficial and serves to improve the conversion of monomer to polymer. When such wetting agents are used alone, however, they do not confer upon the polymer the properties obtained by the use of polyvinyl alcohol. When a wetting agent is employed in addition to the polyvinyl alcohol, amounts of from about 0.05% to about 5%, based on the weight of the monomer, may be employed.

The polyvinyl alcohol may have a wide range in the degree of hydrolysis, i.e. from about 50% up to about 100%, and in molecular weight, i.e. from about 5,000 to about 1,000,000 and even higher, as based on Staudinger molecular weight determination. Any of the commercially available polyvinyl alcohols, such as those marketed under the trade name Elvanol, may be suitably employed for the practice of the present invention.

The oxidizing agent of the catalyst is chloric acid or a water-soluble chlorate such as sodium, potassium or ammonium chlorate; and the reducing catalyst is sulfurous acid or its water-soluble salts, including sodium, potassium and ammonium sulfites, bisulfites and metabisulfites. The recommended quantity of the oxidizing component ranges from about 0.02 to about 2.4% of chlorate ion based on the weight of acrylonitrile. From about 1 to about 9 moles of sulfurous acid or its corresponding salts (0.5 to 4.5 moles in the case of the metabisulfites) may be used per mole of the chloric acid or its corresponding salts. It is thought that the best results are obtained with a mole ratio of the former to the latter of 3:1. These proportions are perhaps more accurately stated as about 1 to 9 gram atoms of sulfur in the reducing agent per gram atom of chlorine in the oxidizing agent, i.e. in the ratio of sulfur to chlorine of 1:1 to 9:1, respectively.

The successful practice of the process of our invention requires the utilization of a polyvinyl alcohol and a catalyst system of the particular class described above. In addition, however, certain other features may be used to obtain still more favorable results. Thus, the presence of a wetting agent or dispersant in the body of acidified water permits polymerization at a relatively high solids content within the range of about 10 to 25%; increases the conversion of monomer to polymer, and contributes materially both to the capacity of the reaction equipment and to the yields obtained. Among the many suitable agents of this type which may be employed are the various compounds of this type which are commercially available, including those classified as anionic, cationic or nonionic. Illustrative of materials of this type which are available include, for example, sodium dioctyl sulfosuccinate, sodium lauryl sulfate, alkylaryl polyether alcohol, such as ethylene oxide condensation product of octyl phenol and ethylene oxide condensation product of nonyl phenol; alkali metal salt of disproportionated rosin acids, e.g. alkali sodium salt of disproportionated rosin acids, alkali potassium salt of disproportionated rosin acids; dihexyl ester of sodium sulfosuccinic acid, diamyl ester of sodium sulfosuccinic acid, sodium salt of alkylaryl sulfonate, decyl benzene sodium sulfonate, isopropyl naphthalene sodium sulfonate, diamyl ester of sulfosuccinic acid, diisobutyl sodium sulfosuccinate, isopropyl naphthalene sodium sulfonate, glyceryl monostearate, bis(alkyl phenol)-polymethylene sulfonate, monobutyl biphenyl sodium monosulfonate, dibutylphenyl phenol sodium disulfonate, sorbitan sesquioleate, polyoxyethylene sorbitan monooleate, glycerol sorbitan laurate, polyoxyethylene sorbitol laurate, polyoxyethylene lauryl ether, polyoxyethylene monostearate, sodium salt of a condensed alkyl sulfonic acid, alkylaryl sulfonates, polyoxyethylene propylene glycol monostearate, polyglycol ether ester of fatty acids, alkyl amido alcohol, alkyl amino sulfate, monolaurate of polyethylene glycol, a polyethylene glycol ester of oleic acid, amine salt of an alkylaryl sulfonate, stearyl dimethyl benzyl ammonium chloride, lauroyl diethanolamine amide, various pyridinium compounds, e.g. lauryl pyridinium iodide; various quaternary ammonium compounds, e.g. lauryl dimethylbenzyl ammonium chloride, and the like. The amount of wetting agent recommended is between about 0.05% and about 5%, based on the weight of the monomer. While any suitable reaction temperatures within the range of about 20°–70° C. may be employed, optimum results are obtained at about 40° C.–50° C. A relatively constant reaction temperature is also highly desirable at whatever level is selected. The rates at which the acrylonitrile and catalyst solutions are injected will vary somewhat, depending on the particular reaction temperature to be maintained, but in all cases they should be such that the weight ratio of catalyst to acrylonitrile is maintained approximately constant. The quantity of acid added to the reaction mixture should be sufficient to maintain the pH within the range of about 1.0 to about 6.0, and preferably between 2.5 and 4.0. Less acid is required when either chloric acid or sulfurous acid is introduced as a component of the catalyst. Sulfuric, hydrochloric and a wide variety of other acids may be used for adjusting the acidity of the reaction mixture.

An important advantage of the process of our invention resides in the close control in the molecular weight of the polyacrylonitrile that can be obtained by adjusting the weight ratio of the chlorate ion to the acrylonitrile. We have found that when the weight of the chlorate ion present is varied between about 0.02% and 0.8% of the acrylonitrile, polyacrylonitriles of widely varying molecular weights are obtained. The molecular weight of the polymer decreases as the amount of chlorate compound increases; thus, for example, when 0.08% of chlorate ion is employed, a polymer having a specific viscosity of 8.4 and a molecular weight of about 300,000 is obtained, whereas with 0.4% of chlorate ion the specific viscosity of the product is about 3.26 and the molecular weight is about 170,000. Larger quantities of chlorate ion within the range of 0.4 to 0.8% will, of course, produce polyacrylonitriles of still lower specific viscosity and molecular weights ranging approximately from 50,000 to 170,000. In all cases, conversions well over 90% are obtained when conditions specified in the invention are observed; and under the preferred operating conditions described below, these conversions are generally in the range of 93–98%.

The invention will be described in greater detail in conjunction with the following illustrative examples in which all parts are given in terms of weight unless otherwise stated.

EXAMPLE 1

A solution of 40 parts by weight of 10% polyvinyl alcohol and 16 parts of a 25% solution of sodium dioctyl sulfosuccinate wetting agent (Aerosol OT) in 2290 parts of water are charged into a suitable reaction vessel which is equipped with an inlet and outlet for maintaining an atmosphere of inert gas, reflux condenser, thermometer, and indirect heating means. The system is swept with carbon dioxide before the reaction begins and a slow stream of this gas is maintained through the kettle while the reaction is being carried out. The temperature of the water in the kettle is raised to 49°–50° C. at the beginning and maintained constant throughout the reaction.

The catalyst components, sodium chlorate and sodium metabisulfite ($Na_2S_2O_5$), in the amounts indicated in the table below, are each dissolved in 400 parts of water. 800 parts of acrylonitrile is used in each run.

The addition of the monomer and catalyst is begun simultaneously at such rates that the addition is complete in 100 minutes. At the end of this time, both catalyst and acrylonitrile streams are shut off; but the polymerization is allowed to continue for an additional 60 minutes, after which the batch is cooled and discharged. Specific viscosity (1% in dimethyl formamide) and conversion determinations are then made and the results are tabulated immediately below.

*Table I*

EFFECT OF CATALYST CONCENTRATION ON SPECIFIC VISCOSITY ($\eta_{sp}$) OF POLYACRYLONITRILE

| Percent $ClO_3$ on Monomer | Parts $NaClO_3$ | Parts $Na_2S_2O_5$ | $\eta_{sp}$ of Polymer | Percent Conversion |
|---|---|---|---|---|
| 0.20 | 2.0 | 5.36 | 3.26 | 94.3 |
| 0.14 | 1.45 | 3.88 | 4.2 | 97.4 |
| 0.12 | 1.2 | 3.21 | 5.23 | 96.7 |
| 0.11 | 1.08 | 2.89 | 5.72 | 96.3 |
| 0.08 | 0.8 | 2.14 | 8.4 | 93.5 |

While any suitable hydrolysis procedure may be used, a more fluid and more homogeneous mass is obtained during hydrolysis when the alkali is pumped into the hot polyacrylonitrile slurry. Accordingly, the following method is recommended. A jacketed kettle equipped with a reflux condenser and a powerful stirrer is charged with 3000 parts by weight of a 10% slurry of polyacrylonitrile in water and any unreacted acrylonitrile monomer is distilled off by raising the batch temperature to 95°–100° C. An equal volume of water is charged into the kettle to replace this distillate. The required amount of sodium hydroxide in the form of a 50% aqueous solution is added over a one-hour period while the reaction mixture is kept at 95°–100° C.; the hydrolysis time is taken after the caustic soda has all been charged. 0.55 mol of alkali are used per mole of acrylonitrile in the polymer. The hydrolysis times are given in the following table for hydrolysis of the polyacrylonitrile of 5.5 specific viscosity, together with the pH and viscosities in centipoises of the resulting products at concentrations of 15% solids by weight.

*Table II*

EFFECT OF HYDROLYSIS CONDITIONS ON HYDROLYZED POLYACRYLONITRILE

| Hours Hydrolysis | NaOH, Moles | pH | Viscosity at 15%, cps. |
|---|---|---|---|
| 1 | 0.55 | 11.1 | 133,500 |
| 2 | 0.55 | 10.25 | 90,000 |
| 3 | 0.55 | 10.0 | 60,000 |

It is found that the polymer obtained by the catalytic polymerization step described above may be hydrolyzed in one to two hours, whereas three hours or longer are generally required to hydrolyze the polymers obtained by other processes.

EXAMPLE 2

The procedure of Example 1 is followed substantially with the exception that 80 parts of 10% polyvinyl alcohol is employed and the wetting agent, sodium dioctyl sulfosuccinate, is omitted. 18 parts of sulfuric acid is added which provides a pH of 3.0–3.2. 1% by weight of sodium chlorate and 2.68% by weight sodium metabisulfite, based on the weight of acrylonitrile (800 parts) are dissolved separately in 100 parts of deionized water and with the monomer are fed as separate streams into the polyvinyl alcohol-water mixture in the reaction vessel over a period of 100 minutes. A slow stream of $CO_2$ is bubbled through the mixture which is maintained at 49–51° C. The mixture is reacted at 51° C. for an additional 1 hour. The conversion of monomer to polymer is 90.8%. The product is neutralized to a pH of 7.5–8.0.

Hydrolysis: The unreacted monomer is removed from the polymer slurry obtained above by distillation and 500 parts of a 10% aqueous slurry of polyacrylonitrile prepared from this product and introduced into a stainless steel jacketed vessel. The temperature is raised to 95° C. and 0.62 mol of 50% NaOH are added slowly over a period of 1 hour. The rate of utilization of NaOH, which is a measure of the rate of hydrolysis, is obtained from the pH readings at intervals as follows.

Time (hours): pH
1 ------------------------------------- 11
2 ------------------------------------- 10.5
3 ------------------------------------- 10.0
4 ------------------------------------- 9.75

A clear reaction product is obtained.

EXAMPLE 3

The procedure of Example 2 is repeated, with the exception that 32 parts of a 25% solution of sodium dioctyl sulfosuccinate is substituted in place of the polyvinyl alcohol. The reaction conditions of Example 2 are utilized. The conversion of monomer to polymer is 78%.

Hydrolysis: The polymeric product is distilled as in Example 2 to remove unreacted monomer and 500 parts of a 10% aqueous slurry of the polymer is subjected to the hydrolysis reaction with 0.62 mole NaOH per mole of acrylonitrile. The pH readings at intervals which measure the rate of hydrolysis are as follows.

Time (hours): pH
1 ------------------------------------- 12.4
2 ------------------------------------- 12.2
3 ------------------------------------- 12.1
4 ------------------------------------- 12.0

After 15.5 hours, the product is still cloudy.

A second and separate hydrolysis run on the polyacrylonitrile prepared in Example 3 with 0.55 mole NaOH per mole acrylonitrile (as used in hydrolyzing the product of Example 1) was found very difficult. After 4 hours, the pH remained substantially unaltered at 12.3.

EXAMPLE 4

Into a suitable reaction vessel equipped with stirrer, thermometer, inert gas purge, reflux condenser, inlet and outlet ports and indirect heating means is introduced 582 parts of deionized water, 4 parts of a 25% aqueous solution of the wetting agent, Triton X-100, an octyl phenol ethylene oxide condensation product, and 0.75 part 6 N $H_2SO_4$. The mixture is deaerated by bubbling carbon dioxide therethrough. The solution, having a pH of 3.1, is heated to 49–50° C. 200 parts of acrylonitrile and 100 parts of an aqueous solution containing 0.362 part sodium chlorate and 100 parts aqueous solution containing 0.970 part sodium metabisulfite are added separately but simultaneously over a period of 100 minutes. Stirring and a reaction temperature of 49–50° C. are maintained for an additional 1 hour. A weighed sample taken for the determination of conversion of monomer to polymer is filtered and the polymer is dried and weighed. The conversion is 48%. The main body of the reaction product is thereafter neutralized to a pH of 7.5–8.0.

Hydrolysis: The unreacted monomer is removed from the slurry obtained in the above example by distillation and sufficient deionized water added to the polymer slurry to provide 500 parts of 10% polyacrylonitrile solids. The slurry is stirred and heated to 95° C. 52.8 parts of a 50% NaOH (0.7 equivalent) is added uniformly over a 1-hour period. The temperature is maintained at 95–98° C. The rate of hydrolysis and rate of utilization of alkali hydroxide is evidence by the pH value of the reaction product at hourly intervals.

Time (hours): pH
1 ------------------------------------- 12.5
2 ------------------------------------- 12.0
3 ------------------------------------- 11.7

EXAMPLE 5

The procedure of Example 4 is repeated, with the exception that in addition to the 4 parts of 25% solution of Triton X-100, 10 parts of a 10% aqueous solution of polyvinyl alcohol is employed in the polymerization reaction. The conversion is 94.7%. The results upon hydrolyzing the polymer prepared in this example are indicated by the following pH readings.

Time (hours): pH
1 ------------------------------------- 10.35
2 ------------------------------------- 9.4
3 ------------------------------------- 9.2

EXAMPLE 6

The procedure of Example 4 is repeated, with the exception that 10 parts of a 10% solution of Duponol ME, lauryl sodium sulfate, is employed in place of the 4 parts of 25% Triton X-100. A conversion of 92% is obtained. The data obtained at 3-hour intervals during the hydrolysis of the polymer is the following.

Time (hours): pH
1 ------------------------------------- 13.0
2 ------------------------------------- 13.0
3 ------------------------------------- 13.0

EXAMPLE 7

The procedure and conditions of Example 4 are utilized, with the exception that 10 parts of a 10% polyvinyl alcohol solution is added to the polymerization reaction mixture, together with 2 parts of Duponol ME in place of the octyl phenol ethylene oxide condensation product used in Example 4. The conversion of monomer to polymer is 96.2%.

Hydrolysis: After removal of the unreacted monomer, 3,000 parts of a 10% aqueous solution of the above polymer is hydrolyzed by the slow introduction of 317 parts of 50% NaOH (0.7 mole) over a 1-hour period and reaction continued for a 4-hour period.

The rate of hydrolysis is obtained from the following pH readings.

Time (hours): pH
1 _____ 12.2
2 _____ 11.0
3 _____ 10.4
4 _____ 9.65

A clear reaction product is obtained.

The pertinent data of the foregoing examples is summed up in Table III. It is seen that whenever polyvinyl alcohol is used, the hydrolysis proceeds much more rapidly as indicated by the pH measurement of the reaction products. A lower pH value means more NaOH being consumed in hydrolysis.

TABLE III

| Ex. | PVA,[1] percent | Wetting Agent | Percent Conversion | Ratio, NaOH/AN | pH after 2 hours |
|---|---|---|---|---|---|
| 3 | None | Aerosol OT | 78.0 | 0.62 | 12.2 |
| 2 | 1.0 | None | 90.8 | 0.62 | 10.5 |
| 3 | None | Aerosol OT | 78.0 | 0.55 | [2]12.3 |
| 1 | 0.5 | ---do--- | 95.6 (ave.) | 0.55 | 10.3 |
| 4 | None | Triton X-100; 0.5% | 48.0 | 0.7 | 12.0 |
| 5 | 0.5 | ---do--- | 94.7 | 0.7 | 9.4 |
| 6 | None | Duponol ME; 0.5% | 92.0 | 0.7 | 13.0 |
| 7 | 0.5 | ---do--- | 96.2 | 0.7 | 11.0 |

[1] Polyvinyl alcohol.
[2] Very difficult to hydrolyze.

From the foregoing description and examples, it will be seen that the invention provides unusually high yields of hydrolyzed polyacrylonitrile in a shorter reaction time with better control of molecular weight and using less alkali for hydrolysis in comparison with the prior art. Moreover, the novel hydrolyzed product can be made with a significantly lower content of free alkali or inorganic salts than comparable products of the prior art. Further, this new material is unusually light in color, having only a light yellow tint and is therefore especially suited for use as a thickening agent for dyestuff pastes and as a binding agent in textile-treating compositions, such as warp sizes, wherein discoloration is objectionable.

Although the invention has been described and illustrated by certain specific examples, it will be understood that variations and substitutions of equivalents may be resorted to within the scope of the appended claims. For example, potassium hydroxide and lithium hydroxide may be utilized in place of caustic soda in the hydrolysis reaction with equivalent results for the purposes of the present invention.

This is a continuation-in-part application of our copending patent application, Serial No. 473,804, filed December 8, 1954, now abandoned.

We claim:

1. A process of producing hydrolyzed polyacrylonitrile which comprises polymerizing acrylonitrile in an acidic aqueous medium having from about .1% to about 5%, based on the weight of acrylonitrile, of polyvinyl alcohol dissolved therein, at a temperature of between about 20° C. and 70° C. in the presence of an oxidizing agent selected from the group consisting of chloric acid and its water-soluble salts and a reducing agent of the group consisting of sulfurous acid and its water-soluble salts in which the chlorate ion content amounts to between about 0.02 and about 2.4% of the weight of acrylonitrile and the ratio of gram atoms of sulfur in the reducing agent to gram atoms of chlorine in the oxidizing agent is between about 1:1 and 9:1, and hydrolyzing the resulting polyacrylonitrile after substantial completion of the polymerization reaction by reacting it with an aqueous solution of between about 0.5 and about 0.8 mol of alkali metal hydroxide for each mole of acrylonitrile in the polymer.

2. A process according to claim 1 in which the aqueous medium contains from about 0.02% to about 0.5%, based on the weight of the polymerization mixture, of a wetting agent.

3. A method of producing hydrolyzed polyacrylonitrile which comprises introducing into a body of acidified water having from about 0.05 to about 5% of a wetting agent and from about 0.1 to about 5% of polyvinyl alcohol dissolved therein, based on the weight of monomer, a stream of acrylonitrile and separate streams of an oxidizing agent selected from the group consisting of chloric acid and its water-soluble salts and a reducing agent of the group consisting of sulfurous acid and its water-soluble salts at rates sufficiently slow to maintain a substantially constant reaction temperature of between about 20° C. and 70° C. in said body and such that the chlorate ion content amounts to between about 0.02 and about 2.4% of the weight of acrylonitrile and the ratio of gram atoms of sulfur in the reducing agent to gram atoms of chlorine in the oxidizing agent is between about 1:1 and 9:1, the amount of acrylonitrile being such as to form a product slurry of between about 10 and 25% solids, holding the resulting mixture at said reaction temperature until polymerization of the acrylonitrile in substantially completed, and hydrolyzing the resulting polyacrylonitrile by reacting it with an aqueous solution of between about 0.5 and about 0.8 mol of alkali metal hydroxide for each mole of acrylonitrile in the polymer.

4. A hydrolyzed polyacrylonitrile prepared by the process of claim 1.

5. A method of producing hydrolyzed polyacrylonitrile which comprises introducing into a body of acidified water, having from about 0.05 to about 5% of a wetting agent and from about 0.2 to about 2% polyvinyl alcohol dissolved therein, a stream of acrylonitrile and separate streams of an oxidizing agent selected from the group consisting of chloric acid and its water-soluble salts and a reducing agent selected from the group consisting of sulfurous acid and its water-soluble salts, at rates sufficiently slow to maintain a substantially constant reaction temperature of between about 20° C. and 70° C. in said body and such that the chlorate ion content amounts to between about 0.02 and about 2.4% of the weight of acrylonitrile and the ratio of gram atoms of sulfur in the reducing agent to gram atoms of chlorine in the oxidizing agent is between about 1:1 and 9:1, the amount of acrylonitrile being such as to form a product slurry of between about 10% and about 25% solids, holding the resulting mixture at said reaction temperature until polymerization of the acrylonitrile is substantially completed, and hydrolyzing the resulting polyacrylonitrile by reacting it at a temperature of between 80° C. and 150° C. with an aqueous solution of between about 0.5 and about 0.8 mol of alkali metal hydroxide for each mole of acrylonitrile in the polymer.

6. A method of producing hydrolyzed polyacrylonitrile which comprises introducing into a body of acidified water in which a pH of about 2.5 and 4 is maintained having from about 0.05 to about 5% of a wetting agent and from about 0.2 to about 2% polyvinyl alcohol dissolved therein, a stream of acrylonitrile and separate streams of an oxidizing agent selected from the group consisting of chloric acid and its water-soluble salts and a reducing agent selected from the group consisting of sulfurous acid and its water-soluble salts, at rates sufficiently slow to maintain a susbtantially constant reaction temperature of between about 40° C. and 50° C. in said body and such that the chlorate ion content amounts to between about 0.02% and about 2.4% of the weight of acrylonitrile and the ratio of gram atoms of sulfur in the reducing agent to gram atoms of chlorine in the oxiding agent is between about 1:1 and 9:1, the amount of acrylonitrile being such as to form a product slurry of between about 10% and 25% solids, holding the resulting mixture at said reaction temperature until polymerization of the acrylonitrile is substantially completed, and hydrolyzing the resulting polyacrylonitrile by reacting it at a temperature of between 80° C. and 150° C. with an aqueous solution of between about 0.5 and about 0.8 mol of alkali metal hydroxide for each mole of acrylonitrile in the polymer.

7. A process of producing hydrolyzed polyacrylonitrile which comprises polymerizing acrylonitrile in an acidic aqueous medium containing from about 0.05% to about .5%, based on the weight of the polymerizable mixture, of sodium dioctyl sulfosuccinate, said aqueous medium having from 0.1 to 5%, based on the weight of acrylonitrile, of polyvinyl alcohol dissolved therein, at a temperature of 20° C. to 70° C. in the presence of an oxidizing agent selected from the group consisting of chloric acid and its water-soluble salts and a reducing agent of the group consisting of sulfurous acid and its water-soluble salts in which the chlorate ion content amounts to between about 0.08 and about 2.4% of the weight of acrylonitrile and the ratio of gram atoms of sulfur in the reducing agent of gram atoms to chlorine in the oxidizing agent is between about 1:1 and 9:1, and hydrolyzing the resulting polyacrylonitrile after substantial completion of the polymerization reaction by reacting it with an aqueous solution of between about 0.5 and about 0.8 mol of alkali metal hydroxide for each mole of acrylonitrile in the polymer.

References Cited in the file of this patent

UNITED STATES PATENTS

| | | |
|---|---|---|
| 1,984,417 | Mark et al. | Dec. 18, 1934 |
| 2,498,226 | Sully | Feb. 21, 1950 |
| 2,569,470 | Hagemeyer et al. | Oct. 2, 1951 |
| 2,673,192 | Hill | Mar. 23, 1954 |